United States Patent
Levine

(10) Patent No.: US 7,319,742 B2
(45) Date of Patent: Jan. 15, 2008

(54) VOICE INFORMATION STORAGE AND RETRIEVAL SYSTEM AND METHOD

(75) Inventor: David A. Levine, Smyrna, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 359 days.

(21) Appl. No.: 10/606,457

(22) Filed: Jun. 26, 2003

(65) Prior Publication Data

US 2004/0264655 A1    Dec. 30, 2004

(51) Int. Cl.
    *H04M 1/64* (2006.01)
(52) U.S. Cl. ............................... 379/88.18; 379/88.23; 455/412.1; 704/270.1
(58) Field of Classification Search ............... 379/68, 379/88.01, 88.12, 88.13, 88.14, 88.17, 88.18, 379/88.22, 88.23; 455/412.1, 418, 500; 704/275, 704/200, 270.1; 715/727
See application file for complete search history.

(56) References Cited

U.S. PATENT DOCUMENTS

| | | | | |
|---|---|---|---|---|
| 4,462,080 A | * | 7/1984 | Johnstone et al. | 704/200 |
| 5,884,262 A | * | 3/1999 | Wise et al. | 704/270.1 |
| 6,535,586 B1 | * | 3/2003 | Cloutier et al. | 379/88.13 |
| 6,683,940 B2 | * | 1/2004 | Contractor | 379/88.17 |
| 6,731,725 B1 | * | 5/2004 | Merwin et al. | 379/88.23 |
| 7,167,830 B2 | * | 1/2007 | Sravanapudi et al. | 704/275 |
| 2004/0114733 A1 | * | 6/2004 | Lawson et al. | 379/88.18 |
| 2004/0213385 A1 | * | 10/2004 | Hartselle et al | 379/88.17 |
| 2005/0009507 A1 | * | 1/2005 | Gilbert | 455/412.1 |

* cited by examiner

*Primary Examiner*—Gerald Gauthier
(74) *Attorney, Agent, or Firm*—Merchant & Gould

(57) ABSTRACT

Methods and systems are provided for allowing a telecommunications services subscriber to call a voice information application from a wireline or wireless telephone to allow the subscriber to record and save voice information and access, review and modify previously stored information such as subscriber contacts information, emergency telephone directories, business information, and the like. Information may be stored, accessed and modified by the subscriber via the voice information application by placing a voice telephone call from the subscriber to the voice information application or by contacting the voice information application via a distributed computing environment such as the Internet.

34 Claims, 4 Drawing Sheets

VOICE INFORMATION STORAGE AND RETRIEVAL SYSTEM AND METHOD

FIELD OF THE INVENTION

The present invention relates to methods and systems for recording and accessing information telephonically via a computer telephony interface.

BACKGROUND OF THE INVENTION

As information users have become more and more busy in work, education and leisure, the need for storing, retrieving and otherwise accessing information has steadily increased. Many information users utilize computer-enabled calendaring systems, contacts programs and a variety of other software applications for storing and accessing information. Many information users utilize a variety of desktop and handheld computing devices, such as personal digital assistants, for storing and accessing information. Unfortunately, often information users do not have access to a wireline or wireless computing system for storing and accessing information. For example, a user may be in a car, boat or other vehicle, or a user may be in a remote location away from access to a computing system. Often such information users handwrite a note on a memo pad or other handwriting medium to remember information needed for subsequent use. Or, such users often call into a voice mail system using a wireline or wireless telephone in order to leave a message in the user's own voice mail box so that the user may subsequently retrieve the message. Such systems may allow the user to store information for later access, but such systems are cumbersome and inefficient. In the case of a paper memo pad, the user must store the paper memo in a safe place to avoid losing or destroying the memo. In the case of a voice message left by the user on the user's own voice mail box, the user must subsequently listen to the message and either save the message or forward the message back to the user to ensure that the message is available for subsequent use. And, the user has no efficient way to browse saved voice mail messages for a desired message. Such systems do not allow the user to efficiently store information for subsequent access that may be needed to the user. For example, the user may desire to store emergency telephone numbers, contacts information, credit card numbers, and the like.

There is a need in the art for a method and system for storing and accessing information via a wireless or wireline telephone. There is further a need for an efficient method and system for storing, manipulating and accessing information via a distributed computing environment where the information is also accessible telephonically. It is with respect to these and other considerations that the present invention has been made.

SUMMARY OF THE INVENTION

Embodiments of the present invention solve the above and other problems by providing methods and systems for storing, accessing and manipulating information telephonically by allowing an information user to call a voice information storage and retrieval system via a computer telephony interface. Information maintained by the voice information storage and retrieval system may be entered, accessed and manipulated via a computing system via a web server accessible over a distributed computing environment.

According to one aspect of the present invention, a voice information subscriber calls a voice information application by dialing a directory number associated with a voice information storage and retrieval application. The subscriber may place the call from a wireline or wireless telephone. The call from the subscriber is routed through a wireless or wireline telephone network to the voice information storage and retrieval application. The voice information application may be resident at a telecommunications network component such as a services node or voice services node. The call from the subscriber is connected to the voice information application via a computer telephony interface. Once the call is connected between the subscriber and the voice information application, the voice information application may offer a number of options to the subscriber including recording a new message, playing a saved message, playing a previously recorded voice or text file, modifying previously saved or recorded files, or obtaining other information previously stored by the subscriber such as subscriber contacts information, emergency telephone directory numbers, financial information, or any other information helpful to the subscriber that the subscriber may wish to obtain telephonically by calling the voice information application via a wireless or wireline telephone.

According to this aspect of the present invention, the subscriber may communicate with the voice information application via the subscriber's computing device such as a desktop or handheld computer via a distributed computing network such as the Internet. A web server may be utilized to allow the subscriber to launch an Internet-based web page for checking messages, files and other information for subsequent telephonic access by the subscriber. The subscriber may also use the Internet-based web page to update, modify, and add additional information that may be subsequently converted from text to speech and provided to the subscriber by the voice information application via the computer telephony interface during a telephonic communication from the subscriber to the voice information application.

According to another aspect of the present invention, a system according to the present invention includes a voice information application accessible telephonically via a computer telephony interface. The voice information application may be operated from a telecommunications network component, such as a services node or voice services node. The network component may include one or more computing systems and information storage devices. The voice information application is operable to receive voice information from a subscriber via a computer telephony interface. The application may correspond with the subscriber via the computer telephony interface through a series of voice prompts that allow the subscriber to save a voice message, access and review previously stored messages and access and review previously stored information such as subscriber contacts information, emergency numbers, business information, and the like. A web server may be provided for allowing the subscriber to access, review and modify information maintained by the voice information application. Information accessible via the web server may include information previously stored by the subscriber telephonically via the computer telephony interface or previously stored by the subscriber via the web server. Information stored or modified via the web server likewise may be accessed and modified telephonically via the computer telephony interface.

These and other features, advantages, and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
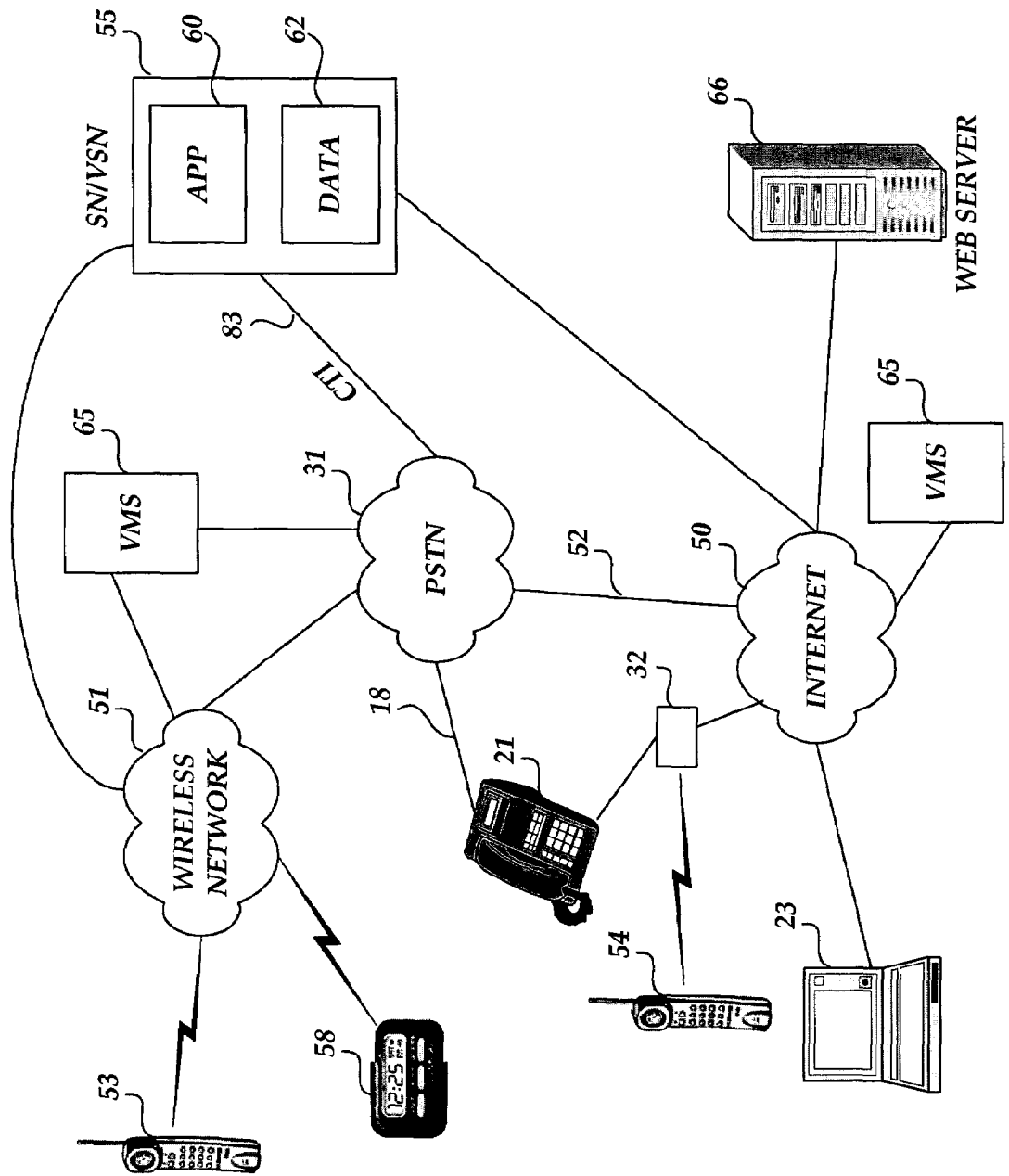
FIG. 1 is a simplified block diagram illustrating components of a wireline and wireless communications network and a distributed computing network that provide an exemplary operating environment for the present invention.

As briefly described above, embodiments of the present invention provide methods and systems for allowing a telecommunications services subscriber to call a voice information application from a wireline or wireless telephone to allow the subscriber to record a voice message, access and review previously stored messages, access previously stored information such as subscriber contacts information, emergency telephone directories, business information, and the like. As briefly described above, information may be stored by the subscriber via the voice information application by placing a voice telephone call from the subscriber to the voice information application or by contacting the voice information application via a distributed computing environment such as the Internet. The embodiments of the present invention described herein may be combined, other embodiments may be utilized, and structural changes may be made without departing from the spirit and scope of the present invention. The following detailed description is, therefore, not to be taken in a limiting sense, and the scope of the present invention is defined by the pending claims and their equivalents. Referring now to the drawings, in which like numerals refer to like components or elements throughout the several figures, aspects of the present invention and an exemplary operating environment will be described.

Operating Environment

FIG. 1 is a simplified block diagram illustrating components of a wireline and wireless communications network and a distributed computing network that provide an exemplary operating environment for the present invention. FIG. 1 and the following description is intended to provide a brief and general description of a suitable operating environment in which embodiments of the present invention may be implemented. While the invention may be described in general context of software programs modules that execute in conjunction with an application program that runs on an operating system of a computer, those skilled in the art will recognize that the invention may also be implemented in a combination of other program modules. Generally, program modules include routines, programs, components, data structures and other types of structures that perform particular tasks or implement particular abstract data types. Moreover, those skilled in the art will appreciate that the invention may be practiced with other telecommunications systems and computer systems configurations, including hand-held devices, multi-processor systems, multi-processor based or programmable consumer electronics, mini computers, mainframe computers, and the like. The invention may also be practiced in a distributed computing environment where tasks are performed by remote processing devices that are linked through a communications network. In a distributing computing environment, program modules may be located in both local and remote memory sources devices.

Referring to FIG. 1, the public switched telephone network (PSTN) 31 generally refers to a worldwide voice telephone network accessible via wireline telephones 21, digital telephones 54 and accessible from wireless telephone networks 51 via wireless telephones 53 and other wireless mobile digital devices 58. For purposes of the description that follows, communication to and from any wireline or wireless telephone 21, 53, 54 includes, but is not limited to, telephone devices that may communicate via a variety of connectivity sources, including wireline, wireless, voice and data over Internet protocol, wireless fidelity (WiFi), ultra wide band communications and satellite communications. The mobile digital device 58 (hereafter MDD) is illustrative of personal digital assistants (PDA), instant messaging devices, voice and data over Internet protocol devices, communication watches or any device allowing digital and/or analog communication over a variety of connectivity means described herein.

The public switched telephone network 31 may include a plurality of central office switches (not shown) and a variety of intelligent telecommunications network components for routing telephone calls from wireline telephones 21 to other wireline telephones 21 throughout the public switched telephone network. Each piece of terminating equipment in the PSTN 31 such as the wireline telephone 21 preferably is assigned a directory number. The term "directory number" is used herein in a manner consistent with its generally understood meaning as a number that is dialed or input by an originating party at an originating station to reach a terminating station associated with the directory number. A directory number, typically a ten digit number, is commonly referred to as a "telephone number" and may be assigned to a specific telephone line, such as the line 18 illustrating connecting the wireline telephone 21 to the public switched telephone network 31. The PSTN 31 is also illustrative of a packet-switched data network over which packetized voice and data may be communicated from communications devices such as the wireline telephone 21, wireless and mobile digital data devices 53, 54 and 58 and via voice and data over Internet protocol over the Internet 50.

As illustrated in FIG. 1, the wireline telephone 21 may be in the form of a conventional telephone for communicating circuit switched voice calls through the PSTN 31. Alternatively, the telephone 21 may be in the form of a digital wired or cordless wired telephone for communicating packetized voice and data via a router device 32 for routing packetized voice and data though a digital data network, such as the Internet 50. The wireless telephone 54 is illustrative of a wireless or cordless wired telephone that is capable of digital packetized voice and data communication through the routing device 32 as described above. In the case of the wireless telephone 54, the routing device 32 may include one or more wireless access points for receiving communications over unregulated spectrum, such as wireless fidelity (WiFi)

including IEEE 802.11 communications and Bluetooth communications. The telephones 21 and 54 may also communicate from the wireless access point/router 32 via a wireless network 51, described below.

The wireless network 51, such as a cellular telecommunications network, may comprise a number of wireless network components such as mobile switching centers (not shown) for connecting communications from wireless subscribers to other terminating communications stations. As illustrated in FIG. 1, the wireless network 51 may be functionally connected to the PSTN 31 for routing wireless communications from the wireless network 51 to terminating stations via the public switched telephone network 31. Communications may be placed and received through the wireless network 51 from wireless communications devices such as the wireless telephone 53 and wireless hand-held computing devices such as the personal digital assistant 58.

The wireless network 51 is also illustrative of other types of wireless connectivity systems including ultra wideband and satellite transmission and reception systems where the wireless telephone 53 and mobile digital device 58 may send and receive communications directly through varying range satellite transceivers. As described for the telephones 21 and 54 above, the devices 53 and 58 may also connect through a digital data network via wireless access points to allow voice and data communication over a packetized digital data network such as the Internet 50. As illustrated in FIG. 1, the wireless devices 53, 58 may communicate with the services node/voice services node (SN/VSN) 55, described below, through the PSTN 31 or directly via a wireless switching center connected to the SN/VSN 55, or via Internet protocol communication through a digital data network such as the Internet 50.

Modem telecommunications networks include a variety of intelligent network components utilized by telecommunications services providers for providing advanced functionality to subscribers. As illustrated in FIG. 1, a services node/voice services node 55 and a voice mail system 65 are illustrated. The services node 55 is implemented with multi-purpose computing systems and memory storage devices for providing advanced telecommunications services to telecommunications services subscribers. In addition to the computing capability and database maintenance features, services nodes 55 may use ISDN lines and may include DTMF signal recognition devices, voice recognition, tone generation devices, text-to-speech (TTS) voice synthesis devices, and other voice or data resources. As illustrated in FIG. 1, the SN/VSN 55 may be implemented for connection from the wireless network 51. Additionally, the SN/VSN may be implemented as a packet-based computing system for receiving packetized voice and data communications. Accordingly, the computing systems and software of the SN/VSN 55 may be communicated with via voice and data over Internet protocol (IP) from a variety if digital data networks, such as the Internet 50 and from a variety of telephone and mobile digital devices 21, 53, 54, 58.

As illustrated in FIG. 1, a voice information application 60 and a data store 62 are resident in the services node 55. According to embodiments of the present invention, the voice information application 60 may be contacted telephonically by a subscriber from a wireline telephone 21, or wireless communications devices 53, 58 in order to store voice information for subsequent use by the subscriber, or in order to access previously stored information. According to an embodiment of the present invention, the voice information application 55 may be assigned a telephone directory number which when dialed by a subscriber via a wireline or wireless telephone accesses the voice information application 60 via a computer telephony interface 83.

The computer telephony interface 83 serves as an interface between the telephone 21 and the computer 23. Computer telephone integration, as facilitated by the computer telephony interface (CTI) 83, is a process for integration of a telephone system with a computing system. For example, the CTI 83 may be used for allowing computer applications to answer incoming calls, provide database information on a computer screen at the same time the call comes in, automatically route and reroute calls, automatically dial and speed dial outgoing calls and identify incoming customer calls and transfer them to predetermined destinations based on calling party identification received on the incoming telephone call. The computer telephony interface 83 may be a software application program resident on the SN/VSN 55 or at a telephone 21.

According to embodiments of the present invention, a voice communication may be conducted by a subscriber from her wireline or wireless telecommunication devices to the voice information application 60 via the computer telephony interface 83 whereby a series of voice prompts may be provided to the subscriber from the application 60 to provide the subscriber options available from the application 60. For example, the subscriber may be provided options including recording a new message, retrieving and reviewing a previously recorded message, reviewing a TTS synthesized text message, or reviewing any other information helpful to the subscriber previously stored via the application 60. If a message is recorded/retrieved using a telephone, an interface could be provided so that different keypad numbers of the telephone can mimic the controls of a tape recorder (e.g., stop, play, record, pause, fast forward, rewind, append, etc.). Information or any other data stored by the subscriber for subsequent access and use by the subscriber may be stored by the application 60 in a memory location such as the data store 62. Information stored in the data store 62 may be indexed to allow the application 60 to readily located stored information files when the subscriber navigates through available information for a desired information file.

According to a preferred embodiment, a plurality of parallel computing systems may be utilized for operating the application 60 and data store 62. Accordingly, if any one computing system is not functioning properly, or if call traffic is excessive, calls placed to the voice information application 60 by a subscriber may be routed to an alternate computing system for access to the voice information application 60 and data 62. Additionally, as should be understood by those skilled in the art, the computing systems responsible for operating the application 60 and data store 62 may be operated remotely from the network component 55 via a distributed computing environment such as the Internet.

According to an alternate embodiment of the present invention, the services node 55 may be in the form of a voice services node that may perform many of the same functions as a services node 55, but that may also include voice/speech recognition capability for receiving, processing and handling incoming calls from the subscriber via voice and speech recognition. Voice/speech recognition utilizes speech-enabled telephony. In "speech-enabled" telephony systems callers may talk, not dial. For example, according to a voice activated dialing system, a caller may speak the words "Call Joe." Speech-enabled telephony makes use of speech recognition and text-to-speech conversion in order to talk to callers. VSNs may find phone numbers, dial them, read a caller her voice and email messages, allow the caller to respond and then send a caller a message over the Internet or over her corporate intranet. Speech enabled telephony allows a subscriber to call the VSN to obtain (hear) information specific for the subscriber.

According to embodiments of the present invention, the SN/VSN 55 also includes general computing functionality including a computer processor and associated memory for running one or more software applications or software modules described herein and for storing associated data. According to embodiments of the present invention, the SN/VSN 55 may receive and process return data from those databases. The SN/VSN 55 is further operative, in association with the voice information application 60, to send and receive data through a distributed computing network, such as the Internet 50, to a variety of remote data storage mediums and local and remote information resource providers such as may be available at the server 66.

According to embodiments of the present invention, once a subscriber has contacted and is in communication with the voice information application 60, the keys of the telephone keypad of the subscriber's wireline or wireless telephone may be used to navigate information available to the subscriber. For example, the "4" key made by used for rewind functionality, the "6" key may be used for forward functionality, the "7" key may be used to obtain the next message, and the "3" key may be used to delete a message. As is well known to those skilled in the art, use of DTMF recognition functionality at the service node 55 may be used to signal the voice information application 60 based on key selection made by the subscriber. As should be understood by those skilled in the art, a variety of key selections or combinations of key selections may be programmed to signal the voice information application to navigate through the functionality provided by the voice information application. Alternatively, as described above with reference to the voice services node, voice or speech recognition functionality may be utilized to allow the subscriber to navigate the functionality of the voice information application 60 by voice or speech recognition. For example, using speech recognition functionality, the subscriber may be able to speak the words "please provide me a menu of my saved messages." Once this spoken command is parsed and analyzed by the voice recognition application available to the voice services node 55, a menu of saved messages may be provided to the subscriber. Other voice commands may be utilized by the subscriber to obtain other functionality of the voice information application 60, as described herein.

According to another embodiment of the present invention, the computing functionality of the services nodes and voice services nodes 55 described above for operating the voice information application 60 and data storage 62 may be operated from a different telecommunications systems component such as the voice mail system 65. The voice mail system 65 typically includes a computer or collection of computers, recording and recording playback devices, and software for recording announcements for incoming calls, recording and playing back recorded messages, and for receiving incoming calls and for making outgoing calls at the direction of the network. The voice mail system 65 has memory capacity for saving announcements to incoming callers and for saving messages from incoming callers. As illustrated in FIG. 1, the VMS 65 may receive communications via the PSTN 31 and the wireless network 51. The computing system of the voicemail system 65 may send and receive voice communications and data communications including voice and data over Internet protocol and electronic mail via a digital data network such as the Internet 50.

As briefly described above, a voice information subscriber according to the present invention may access, review, update or otherwise modify information available to the voice information application 60 via a distributed computing network, such as the Internet 50. The Internet 50 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art.

According to embodiments of the present invention, a web server 66 may be provided to allow the subscriber to log on to an Internet-based web page for accessing, reviewing, updating, or otherwise modifying data available to the voice information application 60. As is understood by those skilled in the art, the server 66 is a computer or collection of computers and associated memory storage. The server 66 may include a computer or software application that responds to commands from a client computer, for example, the SN/VSN 55 according to the present invention. When a client computer submits a request for information to the server, the server transfers a copy of the information to the client computer. For example, as will be described in detail below, a subscriber may log on to an Internet-based web page operated via the web server 66 to provide information that the subscriber may wish to subsequently access telephonically via the subscriber's wireline or wireless telephone. That is, the subscriber may log on to the web server 66 via the subscriber's computer 23 and add helpful information such as emergency contact information to the data store 62 accessible by the voice information application 60. Subsequently, when a subscriber calls the voice information application 60 via the subscriber's wireline or wireless telephone from some remote location, a TTS voice synthesizer at the services node/voice services node 55 may convert the text-based information entered by the subscriber to speech in order to play the information to the subscriber via the computer telephony interface 83 upon the subscriber's demand.

According to embodiments of the present invention, the voice information application 60 may synchronize with other software applications on the subscriber's computer 23 or on the web server 66 or other computing systems to upload information required by the subscriber. For example, the subscriber may operate a calendaring and contacts software application such as Outlook® manufactured by Microsoft Corporation on the subscriber's computer 23. The voice information application 60 may be programmed to synchronize with the calendaring and contacts software application of the subscriber on a periodic basis to upload any changes in the subscriber's contacts and calendaring information so that the subscriber may contact the voice information application 60 telephonically from her wireline or wireless telephone to obtain updated information.

Operation

Figure 2:
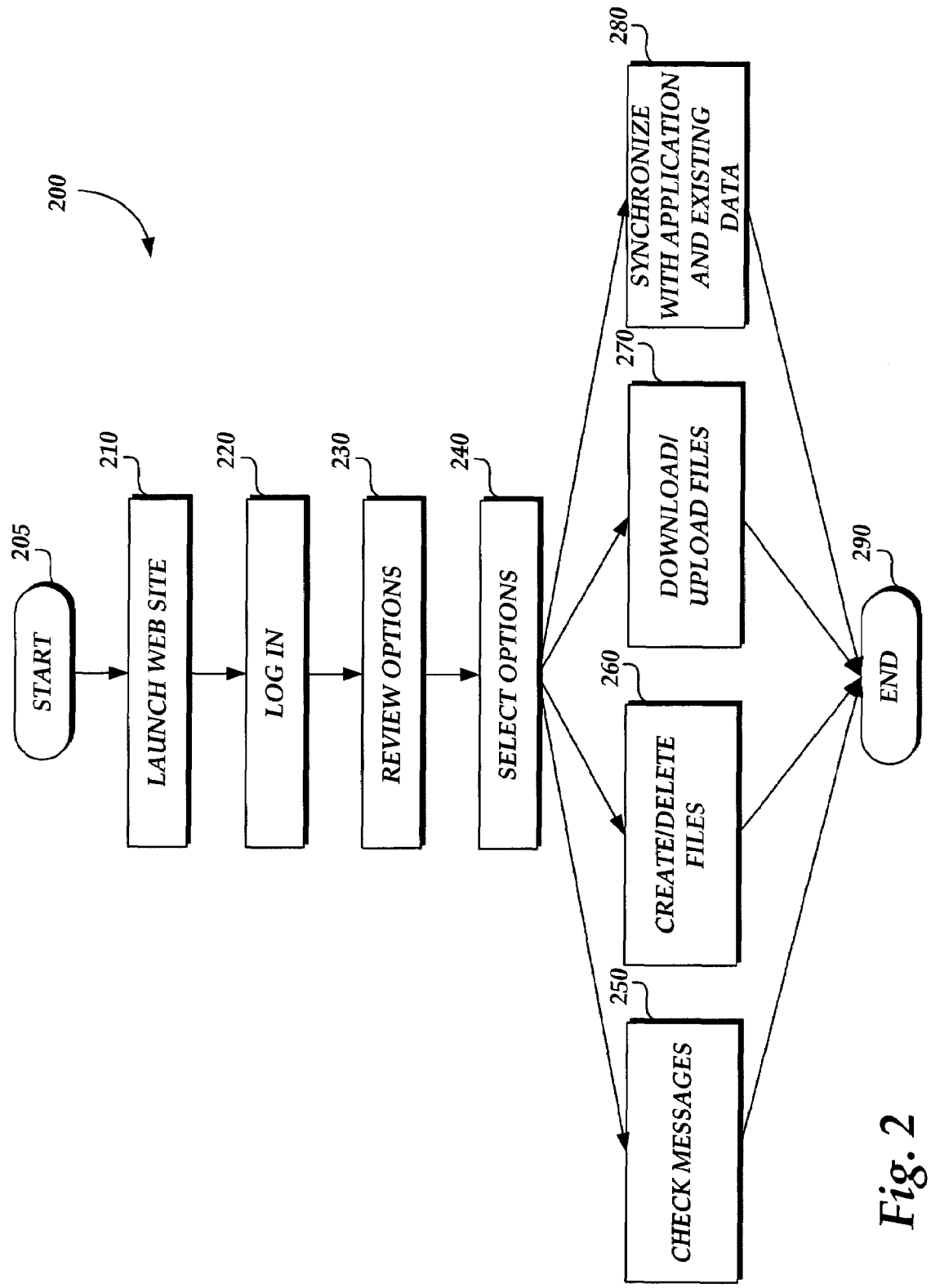
FIG. 2 illustrates a logical flow of the steps performed by a method and system of the present invention for accessing information available to a voice information application via a distributed computing environment such as the Internet.
Figure 3:
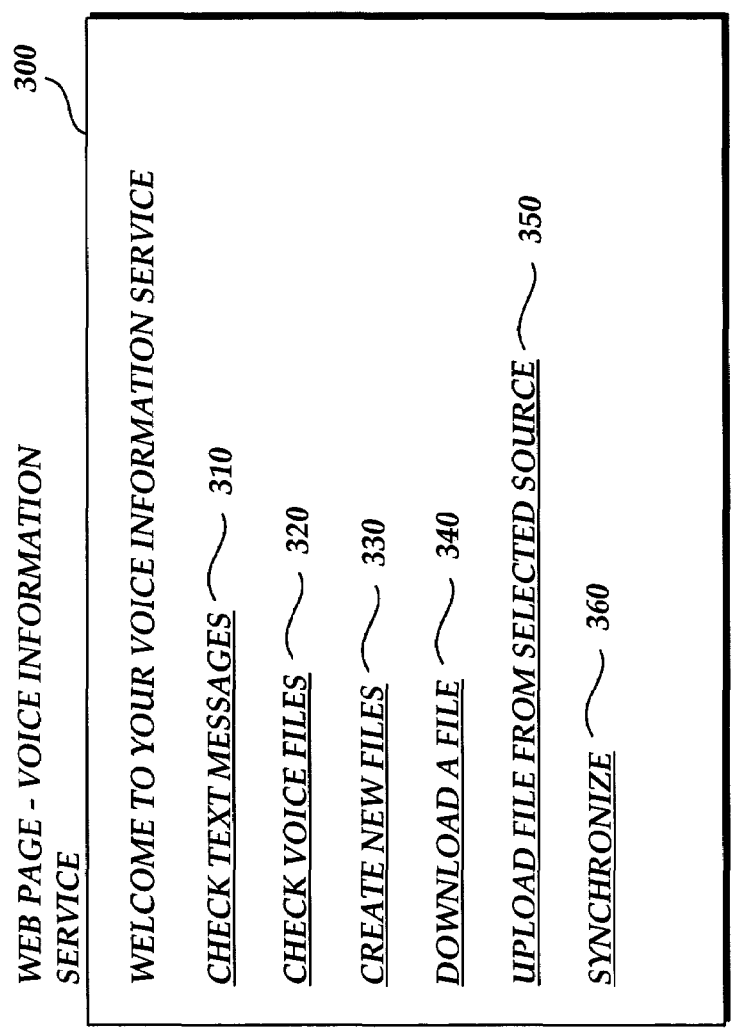
FIG. 3 illustrates a computer screen shot of an exemplary Internet-based web page for providing a subscriber access to files and other information for telephonic access by the subscriber.

As briefly described above, the subscriber may utilize her computer 23 to access a remote web server 66 via a distributed computing environment, such as the Internet 50 in order to access, review, update or otherwise modify information that may be subsequently accessed telephonically by the subscriber using her wireline or wireless telephone. FIG. 2 illustrates a logical flow of the steps performed by a method and system of the present invention for accessing information available to the voice information application via a distributed computing environment. FIG. 3 illustrates a computer screen shot of an exemplary Internet-based web page for providing a subscriber access to files and other information for telephonic access by the subscriber.

Referring to FIG. 2, the method 200 begins at start step 205 and moves to step 210 where the subscriber launches a voice information application web site operated from the web server 66 to access information that may be provided to the subscriber from the voice information application 60 telephonically to the subscriber's wireline or wireless telephones 21, 53. As should be understood by those skilled in the art, the subscriber may be provided a web site address such as "www.voiceinformationapplication.com." Once the subscriber launches the voice information application web site at step 210, the subscriber may be required to log in to the web site at step 220 where the subscriber may be required to provide authenticating information such as a user ID and/or password. According to one embodiment of the present invention, the user ID may consist of the telephone directory number of the voice information application associated with the subscriber's voice information service and the subscriber's password may be a unique identification number created by the subscriber for security purposes.

Once the subscriber has successfully logged in to the voice information application web site, a web page 300, illustrated in FIG. 3, may be provided to the subscriber at step 230 to provide the subscriber a set of options for accessing, reviewing, modifying, or otherwise updating information available to the voice information application 60 for providing to the subscriber. As should be understood by those skilled in the art, the web page 300 illustrated in FIG. 3, along with options illustrated in FIG. 3, is for purposes of example only and is not restrictive of the variety of options and web page presentations that may be provided to the subscriber according to embodiments of the present invention.

According to embodiments of the present invention, at step 230, a variety of options including "check text messages" 310, "check voice files" 320, "create new files" 330, "download a file" 340, "upload file from a selected source" 350, or "synchronize" 360 may be provided to the subscriber. For example, the user may select the "check text messages" 310 to review and modify previously stored text messages that the user wishes to be available for access telephonically by the user via the voice information application 60. Likewise, the user may check voice files by selecting a list of saved voice files to have those voice files played over a speaker system associated with the user's computer 23. That is, the subscriber may check any voice messages left by the subscriber telephonically from the subscriber's wireline or wireless telephone using the well known voice-over-Internet protocol to transfer voice messages left by the subscriber via the voice information application 60 to the web server 66.

The subscriber may also create new files from her computer 23 by entering a text message or text information that the subscriber desires to be available to the user from her wireline or wireless telephones. Other options available to the user include downloading files from the web server 66 to a remote memory storage of the subscriber's computer 23 or to another memory storage unit operated remotely by the subscriber. The subscriber may also wish to upload files from selected sources including memory sources available to the subscriber's computer 23 such as CD-ROMS, diskettes, or information received from Internet data sources.

As briefly described above, the subscriber may also select an option to synchronize data maintained by the subscriber such as calendaring and contacts information with the voice information application 60 so that the voice information application 60 may obtain updated information on a periodic basis through synchronization with a selected data source, such as the calendaring and contacts information application. Referring still to FIG. 2, at step 240, the subscriber selects one or more of the available options and the method proceeds to steps 250, 260, 270, or 280 depending upon the options selected by the subscriber. Once the subscriber has made use of all available options via the web page 300, the method ends at step 290.

As described herein, according to embodiments of the present invention, the subscriber may contact the services of the voice information application 60 via a computer telephony interface 83 from the subscriber's wireline telephone 21 or wireless telephone 53 in order to obtain helpful information or to record information for subsequent use by the subscriber. For example, the subscriber may be located in a remote location such as a vacation or business trip location and the subscriber may not have access to information of a wireline or wireless computing device. Alternatively, the subscriber may be in an awkward location such as driving a car or operating some other type of equipment that prohibits the subscriber from pausing to check handwritten or typed information or to utilize a wireline or wireless computing device to store additional information. According to embodiments of the present invention, the subscriber may contact the services of the voice information application 60 using the subscriber's wireline or wireless telephone to obtain a variety of helpful information or to leave new information for subsequent use by the subscriber.

Figure 4:
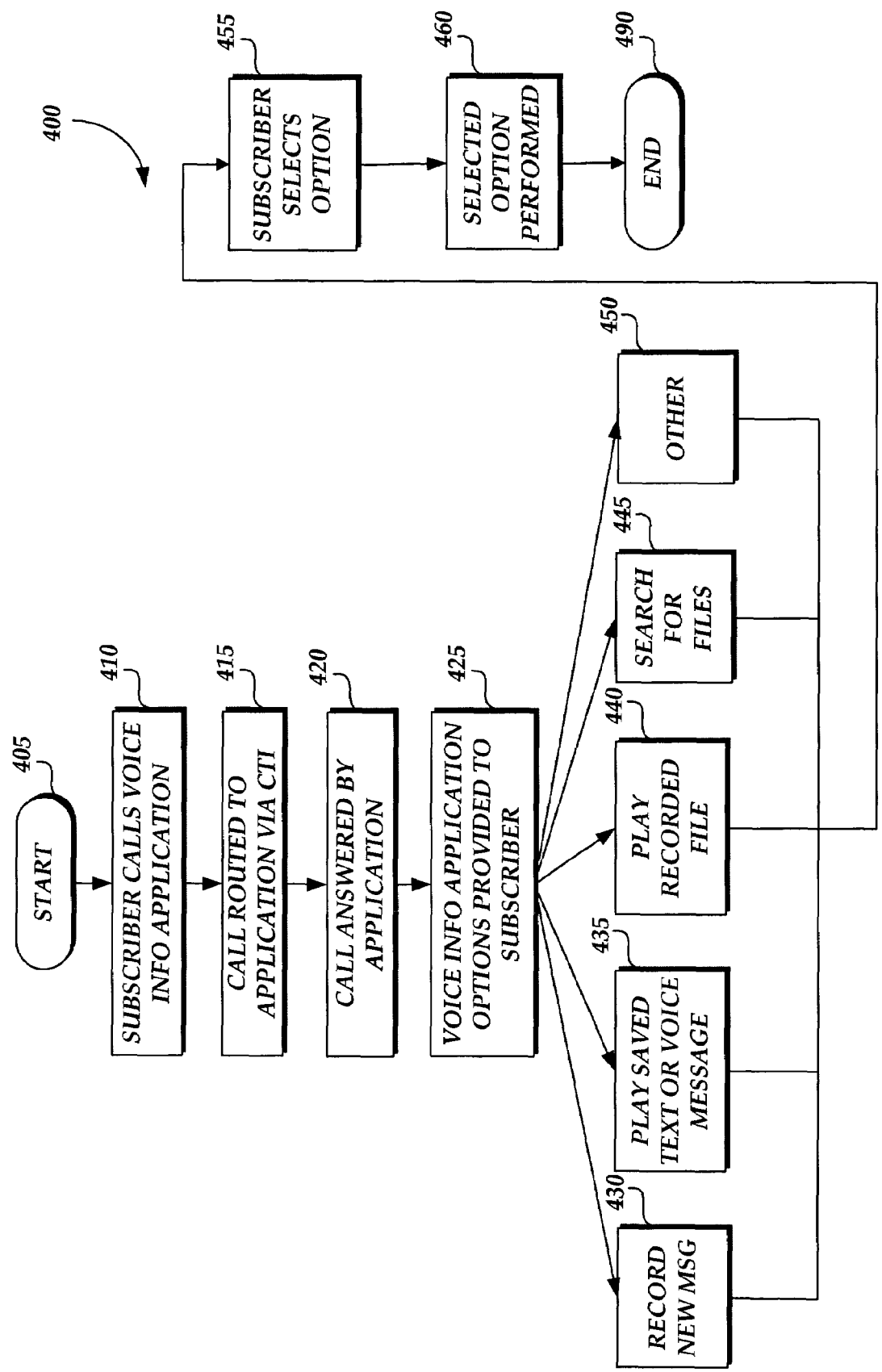
FIG. 4 illustrates a logical call flow of the steps performed by a method and system of the present invention for accessing a voice information application telephonically for storing, reviewing, or modifying subscriber information via the voice information application.

FIG. 4 illustrates a logical call flow of the steps performed by a method and system of the present invention for accessing the voice information application telephonically for storing, reviewing, or modifying subscriber information via the voice information application. The method 400 begins at start step 405 and a voice information application services subscriber places a call to the voice information application 60 from her wireline telephone 21 or wireless telephone 53. For purposes of example, consider that the subscriber may be riding in a vehicle such as an automobile or bus and may desire to call in to the voice information application 60 to retrieve the directions to an office building to which the subscriber is traveling. In anticipation of needing the directions, the subscriber may have previously called into the voice information application 60 to record the directions, or the subscriber may have entered the directions via her computer 23 through the web server 66, as described above with reference to FIGS. 2 and 3.

At step 410, the subscriber dials a telephone directory number from her wireline telephone 21 or wireless telephone 53 that is associated with the voice information application 60. At step 415, the subscriber's call is routed to the voice information application 60 via the public switched telephone network 31 and the computer telephony interface 83 so that the computer system at the services node 55 or voice services node 55 may communicate with the subscriber at the subscriber's telephone 21. Alternatively, if the subscriber calls from the wireless telephone 53, the call is routed via the wireless network 51 through the public switched telephone network 31 to the services node 55 or voice services node 55 to allow communication between the application 60 and the subscriber via the computer telephony interface 83. At step 420, the call is answered by the voice information application 60 and a voice prompt may be provided to the subscriber such as "welcome to the voice information system." As described above, the functionality of the present invention described with reference to FIGS. 2, 3, and 4 is likewise operable via computer systems and data storage operated at a separate network component such as the voice mail system 65.

Next, the voice information application 60 may provide a series of prompts such as "please enter your password" followed by "for service in English press 1, for service in another language press 2." Once the subscriber is authenticated by the voice information application 60, the method proceeds to step 425, and the voice information application options are provided to the subscriber. The subscriber may navigate through available options using the keys of her telephone keypad or via voice commands as described above with reference to FIG. 1. At step 430, the option may be provided to the subscriber to record a new message. For example, if the subscriber needs to record some notes taken from a business meeting the subscriber has attended, the subscriber may select the record new message option at step 430 to record the subscriber's notes for subsequent review. Alternatively, the subscriber may desire to play a saved text or voice message, such as the directions to the subscriber's meeting, as described above. At step 440, the subscriber may decide to play a recorded file, such as a file containing contacts information of interest to the subscriber, or the method may proceed to step 445 where the subscriber may search for files. Other options may be provided to the subscriber at step 450 including issuing commands to the voice information application 60 to perform other functionality such as synchronizing the voice information application 60 with data files of the subscriber as described above with reference to FIGS. 2 and 3.

Advantageously, the subscriber may navigate through retrieved information via the keys of the subscriber's telephone keypad. For example, if the subscriber has retrieved driving directions previously entered via the web server 66, the subscriber may use a key on her telephone keypad designated for "fast forward" to fast forward through a text-to-speech formatted version of the directions played to the subscriber by the application 60 in order to get to a particular portion of the directions of interest to the subscriber. Voice commands may likewise be utilized, as described with reference to FIG. 1, to navigate through information retrieved by the voice information application 60. Navigation of available information is particularly useful for large information files such as subscriber contacts files having large numbers of contacts and related information.

After all available voice information application options are made available to the subscriber, the method proceeds to step 455 and the subscriber selects one of the available options either by selecting a key on the subscriber's telephone keypad or by making a voice or speech selection that is parsed by a voice or speech recognition module in the SN/VSN 55. At step 460, the selected option is performed. That is, if the subscriber desires to record a new message, the subscriber is allowed to record the desired message, or if the subscriber has selected some other option, such as obtaining directions previously input by the subscriber, the directions are played to the subscriber. If the subscriber previously entered the directions as a voice recording, the recording is played to the subscriber. Alternatively, if the subscriber previously entered the directions as a text message from the user's computer 23, as described above with reference to FIGS. 2 and 3, the text message is converted from text to speech at the SN/VSN 55, and the converted message is played as an audio file to the subscriber via the computer telephony interface to the subscriber's wireline or wireless telephone 21, 53. Once the subscriber has obtained all desired functionality from the voice information application 60, the subscriber terminates the call to the voice information application 60 and the method ends at step 490.

As described herein, methods and systems are provided for allowing a telecommunications services subscriber to record telephonically messages for subsequent use by the subscriber. Additionally, the subscriber may access and review a variety of helpful information previously recorded or stored by the subscriber by obtaining the information from the voice information application telephonically at a subscriber's wireline or wireless telephone unit. It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

I claim:

1. A method of storing and accessing information to and from a remote voice information system, comprising:

receiving a call to a voice information application wherein the call is routed to an intelligent network component and wherein routing the call includes routing the call to the voice information application at a telecommunications system services node;

connecting the call to the voice information application;

forwarding a voice information message from a subscriber placing the call;

storing the voice information message for subsequent retrieval by the subscriber;

indexing the stored voice information message for locating the stored voice information by the voice information application;

receiving a request for a stored text information message;

prior to receiving the request for a stored text information message, storing one or more text information messages for access by the voice information application; and periodically synchronizing the voice information application with a subscriber application associated with a subscriber data source to upload changes in the subscriber data source so that the subscriber obtains updated subscriber information in response to connecting the call to the voice information application.

2. The method of claim 1, further comprising:

receiving a request for the stored voice information message from the subscriber;

locating the requested stored voice information message from a data store of information available to the voice information application; and playing the requested stored voice information message to the subscriber.

3. The method of claim 1, further comprising:

locating the requested stored text information in a data store of information available to the voice information application;

converting the requested stored text information message from a text format to an audio format; and playing the audio format message to the subscriber.

4. The method of claim 1, wherein placing the call to the voice information application includes placing the call via a wireline telephone.

5. The method of claim 1, wherein placing the call to the voice information application includes placing the call via a wireless telephone.

6. The method of claim 1, wherein the services node includes a voice services node.

7. The method of claim 1, wherein connecting the call to the voice information application includes connecting the call to the voice information application via a computer telephony interface.

8. The method of claim 3, prior to connecting the call to the voice information application, authenticating a caller placing the call as an authorized subscriber of the voice information application.

9. The method of claim 8, further comprising:
providing the subscriber a set of voice information application options for recording a voice information message and for accessing any previously stored information; and
receiving a voice information application option selection from the subscriber.

10. The method of claim 9, after providing the subscriber a set of voice information application options, allowing the subscriber to navigate through the set of voice information options by selection of telephone keypad keys associated with navigation functionality.

11. The method of claim 9, allowing the subscriber to navigate through a set of voice information application options via voice commands from the subscriber.

12. The method of claim 9, wherein receiving a voice information application option selection from the subscriber includes receiving the voice information application option via a DTMF tone generated from a telephone keypad selection from the subscriber.

13. The method of claim 9, wherein receiving a voice information application option selection from the subscriber includes receiving the voice information application option selection via a voice command from the subscriber.

14. The method of claim 13, further comprising converting the voice command from the subscriber from a voice format to a digital format for processing the voice command by the voice information application.

15. The method of claim 9, further comprising performing the selected option-for the subscriber.

16. The method of claim 15, wherein the selected option includes allowing the subscriber to record a voice information message.

17. The method of claim 15, wherein the selection option includes allowing the subscriber to retrieve and play previously stored voice or text messages.

18. The method of claim 15, wherein the selected option includes allowing the subscriber to retrieve and play a plurality of stored data.

19. The method of claim 15, wherein the selection option includes allowing the subscriber to search a data store of available information that may be retrieved by the subscriber telephonically in audio format.

20. The method of claim 1 wherein storing one or more text information messages includes storing one or more text information messages via an Internet-based web server wherein the web server is accessible by the voice information application.

21. The method of claim 20, further comprising accessing the Internet-based web server by the subscriber for modifying information telephonically accessible by the subscriber via the voice information application.

22. A method of storing and accessing information to and from a remote voice information system, comprising:
receiving a call by a subscriber to a voice information application using a telephone directory number associated with the voice information application;
routing the call to the voice information application at a telecommunications system services node;
connecting the call to the voice information application at the services node via a computer telephony interface;
providing the subscriber a set of voice information application options for recording a voice information message and for accessing any previously stored information;
receiving a request for a stored text information message; and
prior to receiving the request for a stored text information message, storing one or more text information messages for access by the voice information application;
receiving a request from the subscriber for voice information accessible by the voice application from the remote server;
obtaining by the voice information application the requested voice information;
converting the requested voice information message from a text format to an audio format;
playing the audio format message to the subscriber via a subscriber wireline or wireless telephone; and
periodically synchronizing the voice information application with a subscriber application associated with a subscriber data source to upload changes in the subscriber data source so that the subscriber obtains updated subscriber information in response to connecting the call to the voice information application.

23. The method of claim 22, prior to connecting the call to the voice information application via a computer telephony interface, authenticating a caller placing the call as an authorized subscriber of the voice information application.

24. The method of claim 23, after providing the subscriber a set of voice information application options, allowing the subscriber to navigate through the set of voice information options by selection of telephone keypad keys associated with navigation functionality.

25. The method of claim 23, allowing the subscriber to navigate through a set of voice information application options via voice commands from the subscriber.

26. A system for storing and accessing information to and from a remote voice information system, comprising:
a voice information application operative to:
receive a request for a stored text information message;
store one or more text information messages for access by the voice information application prior to receiving the request for a stored text information message;
receive a call from a subscriber for voice information services using a telephone directory number associated with the voice information application;
communicate with the call via a computer telephony interface;
provide the subscriber a set of voice information options;
receive and process a selected voice information option from the subscriber;
parse a data store of information for voice information responsive to the selected voice information option;
provide voice information to the subscriber telephonically via the computer telephony interface; and
periodically synchronize with a subscriber application associated with a subscriber data source to upload changes in the subscriber data source and to provide the subscriber with updated subscriber information in response to receiving the call from the subscriber for voice information services.

27. The system of claim 26, wherein the voice information application is further operative to communicate with the remote server to obtain voice information stored at the remote server by the subscriber.

28. The system of claim 27, wherein the voice information application is further operative
  to pass text-based voice information from the remote server requested by the subscriber to a text-to-speech module for conversion to audio format; and
  to play the audio format voice information to the subscriber.

29. The system of claim 26, wherein the voice information application is further operative to:
  receive a request for stored voice information from the subscriber;
  locate the requested stored voice information from a data store of information available to the voice information application; and
  play the requested stored voice information to the subscriber.

30. The system of claim 26, wherein the voice information application is further operative to authenticate a caller placing the call as an authorized subscriber of the voice information application.

31. The system of claim 26, wherein the selected option includes allowing the subscriber to record a voice information message.

32. The system of claim 26, wherein the selection option includes allowing the subscriber to retrieve and play previously stored voice or text messages.

33. The system of claim 26, wherein the selected option includes allowing the subscriber to retrieve and play a plurality of stored data.

34. The system of claim 26, wherein the selection option includes allowing the subscriber to search a data store of available information that may be retrieved by the subscriber telephonically in audio format.

* * * * *